United States Patent
Lee et al.

(10) Patent No.: US 12,431,584 B2
(45) Date of Patent: Sep. 30, 2025

(54) BATTERY MODULE AND BATTERY PACK INCLUDING THE SAME

(71) Applicant: LG ENERGY SOLUTION, LTD., Seoul (KR)

(72) Inventors: Junghoon Lee, Daejeon (KR); Junyeob Seong, Daejeon (KR); Hyemi Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/909,797

(22) Filed: Oct. 8, 2024

(65) Prior Publication Data
US 2025/0030121 A1    Jan. 23, 2025

Related U.S. Application Data (63) Continuation of application No. 18/574,178, filed as application No. PCT/KR2022/009729 on Jul. 6, 2022.

(30) Foreign Application Priority Data

Jul. 7, 2021    (KR) .................. 10-2021-0089269

(51) Int. Cl.
*H01M 50/383*    (2021.01)
*H01M 50/211*    (2021.01)
(Continued)

(52) U.S. Cl.
CPC ....... *H01M 50/383* (2021.01); *H01M 50/211* (2021.01); *H01M 50/276* (2021.01); *H01M 50/282* (2021.01); *H01M 50/394* (2021.01)

(58) Field of Classification Search
CPC .. H01M 50/358; H01M 50/367; H01M 50/35; H01M 10/4235; H01M 50/30; H01M 50/383
See application file for complete search history.

(56) References Cited

U.S. PATENT DOCUMENTS 9,825,345 B2   11/2017  Liu et al.
2009/0197153 A1  8/2009  Fujikawa et al.
(Continued)

FOREIGN PATENT DOCUMENTS

CN   110459715 A   11/2019
CN   111554837 A    8/2020
(Continued)

OTHER PUBLICATIONS

Kitamura et al., JP-2016035817 Machine Translation (Year: 2016).*
International Search Report (PCT/ISA/210) issued in PCT/KR2022/009729 mailed on Nov. 2, 2022.
Extended European Search Report for European Patent Application No. 22837961, dated Dec. 5, 2024.
(Continued)

*Primary Examiner* — Ula C Ruddock
*Assistant Examiner* — Anna Korovina
(74) *Attorney, Agent, or Firm* — Birch, Stewart, Kolasch & Birch, LLP (57) ABSTRACT

A battery pack can include a battery cell stack having a plurality of battery cells stacked in a first direction, and a battery cover covering the battery cell stack and having a first surface facing the battery cell stack and a second surface opposite to the first surface. The battery cover can include a venting part that extends from the first surface to the second surface of the battery cover, a barrier layer covers the venting part at the first surface of the battery cover, the barrier layer having an inner surface that is exposed to the battery cell stack, and a first refractory part positioned on an outer surface of the barrier layer that is opposite to the inner surface of the barrier layer.

30 Claims, 8 Drawing Sheets

(51) Int. Cl.
    *H01M 50/276*     (2021.01)
    *H01M 50/282*     (2021.01)
    *H01M 50/30*     (2021.01)

(56) References Cited

U.S. PATENT DOCUMENTS

| | | |
|---|---|---|
| 2011/0206957 A1 | 8/2011 | Byun |
| 2012/0114993 A1* | 5/2012 | Park .................. H01M 50/271 |
| | | 429/88 |
| 2014/0234677 A1 | 8/2014 | Yoon |
| 2016/0248062 A1* | 8/2016 | Lee .................. H01M 50/24 |
| 2017/0237054 A1 | 8/2017 | Mast |
| 2017/0237055 A1* | 8/2017 | Shimizu ............ H01M 50/308 |
| | | 429/53 |
| 2017/0309879 A1 | 10/2017 | Ko et al. |
| 2018/0138478 A1* | 5/2018 | Chan .................. H01M 50/271 |
| 2020/0303701 A1 | 9/2020 | Kim et al. |
| 2020/0328389 A1 | 10/2020 | Lloyd |
| 2021/0013460 A1* | 1/2021 | Ootsuki .............. B32B 27/285 |
| 2021/0074971 A1 | 3/2021 | Kim et al. |
| 2021/0074980 A1 | 3/2021 | Kim et al. |
| 2021/0078714 A1 | 3/2021 | Demont et al. |
| 2021/0167344 A1* | 6/2021 | Kwag .................. H01M 50/35 |
| 2021/0391625 A1 | 12/2021 | Egashira et al. |
| 2022/0069409 A1 | 3/2022 | Wakabayashi et al. |
| 2022/0085453 A1 | 3/2022 | Wakabayashi et al. |
| 2022/0115736 A1 | 4/2022 | Oh et al. |
| 2022/0115737 A1 | 4/2022 | Shin et al. |
| 2022/0123428 A1 | 4/2022 | Wakabayashi et al. |

FOREIGN PATENT DOCUMENTS

| | | |
|---|---|---|
| JP | 2009-212081 A | 9/2009 |
| JP | 2009-266402 A | 11/2009 |
| JP | 2016035817 A * | 3/2016 |
| JP | 2016-110881 A | 6/2016 |
| JP | 2019-91628 A | 6/2019 |
| JP | 2019-220478 A | 12/2019 |
| KR | 10-1155887 B1 | 6/2012 |
| KR | 10-2013-0010189 A | 1/2013 |
| KR | 10-1678532 B1 | 11/2016 |
| KR | 10-2018-0113802 A | 10/2018 |
| KR | 10-2091770 B1 | 3/2020 |
| KR | 10-2152886 B1 | 9/2020 |
| KR | 10-2021-0004189 A | 1/2021 |
| KR | 10-2021-0029127 A | 3/2021 |
| KR | 10-2021-0077498 A | 6/2021 |
| WO | WO 2020/110448 A1 | 6/2020 |
| WO | WO 2020/153015 A1 | 7/2020 |
| WO | WO 2020/153017 A1 | 7/2020 |
| WO | WO 2020/153018 A1 | 7/2020 |
| WO | WO 2020/221808 A1 | 11/2020 |

OTHER PUBLICATIONS

Extended European Search Report for European Application No. 25150309.0, dated Mar. 14, 2025.

Unknown, "Wikipedia", Retrieved from the Internet: URL: https://en.wikipedia.org/wiki/Refractory, XP093225442, Jan. 1, 2020.

\* cited by examiner

[FIG. 2]

Conventional Art

BATTERY MODULE AND BATTERY PACK INCLUDING THE SAME

CROSS-REFERENCE TO RELATED APPLICATION

This application is a Continuation application of U.S. patent application Ser. No. 18/574,178, filed on Dec. 26, 2023, which was filed as the National Phase of PCT International Application No. PCT/KR2022/009729, filed on Jul. 6, 2022, which claims priority under 35 U.S.C. § 119 (a) to Korean Patent Application No. 10-2021-0089269, filed in the Korean Intellectual Property Office on Jul. 7, 2021, the entire contents of all these applications being hereby expressly incorporated by reference into the present application.

BACKGROUND

Field

The present invention relates to a battery module and a battery pack including the same, and more specifically to a battery module with enhanced safety and a battery pack including the same.

Discussion of the Related Art

As development of technologies and demands for mobile devices are increased, there is a rapidly increasing demand for rechargeable batteries as energy sources. Accordingly, many studies have been conducted on secondary batteries that can meet various needs.

The rechargeable batteries are attracting a lot of attention as an energy source for power devices, such as electric bicycles, electric vehicles, and hybrid electric vehicles, as well as mobile devices, such as mobile phones, digital cameras, and notebook computers.

Recently, as the need for a large capacity rechargeable battery structure, including the use of rechargeable batteries as an energy storage source, increases, the demand for a battery pack with a multi-module structure in which a plurality of rechargeable batteries are assembled in series/coupled in parallel battery modules is increasing. The battery pack consists mainly of a battery module composed of at least one battery cell, and is composed by adding other constituent elements by using at least one battery module. Since the battery cells constituting the battery module are composed of a chargeable and dischargeable rechargeable battery, such a high power/large capacity rechargeable battery generates a large amount of heat during charge and discharge processes.

Figure 1:
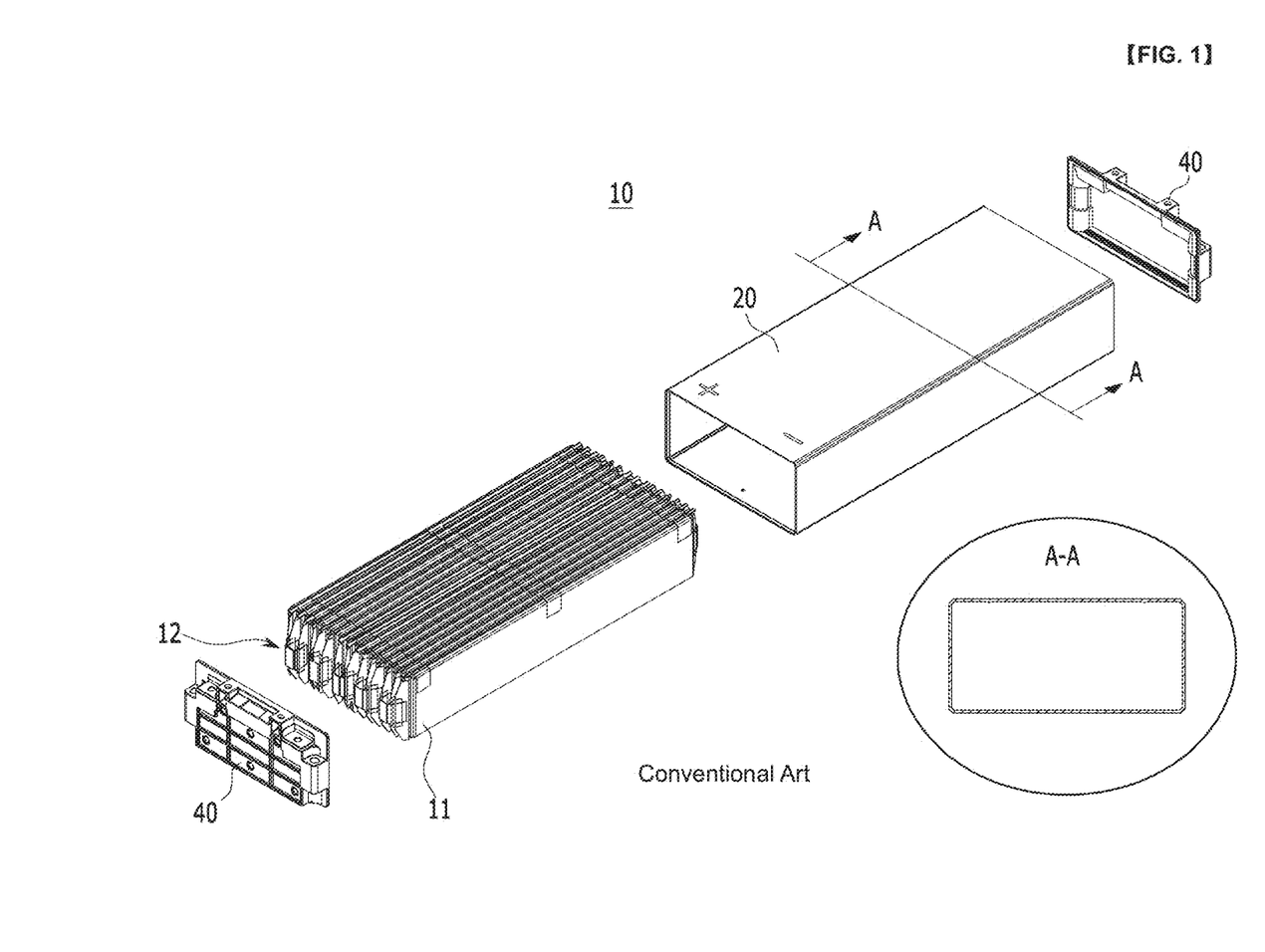
FIG. 1 is an exploded perspective view of a conventional battery module.
Figure 2:
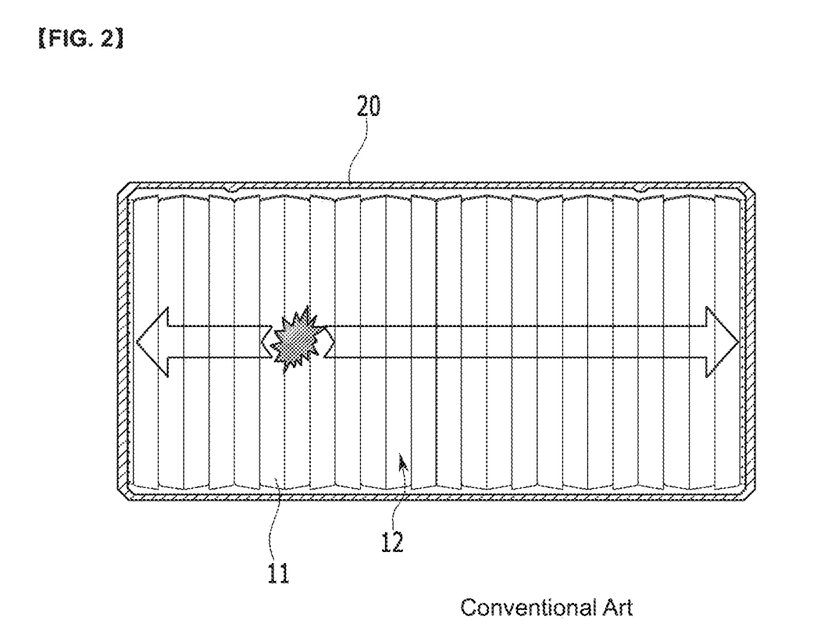
FIG. 2 is a view showing a transfer of a thermal runaway phenomenon during internal ignition of a conventional battery module.

FIG. 1 is an exploded perspective view of a conventional battery module. FIG. 2 is a view showing a spread of a thermal runaway phenomenon during internal ignition of a conventional battery module.

Referring to FIG. 1 and FIG. 2, a conventional battery module 10 includes a battery cell stack 12 in which a plurality of battery cells 11 is stacked, a frame 20 receiving the battery cell stack 12, and end plates 40 formed on the front and rear surfaces of the battery cell stack 12.

The battery cell stack 12 may be positioned in a closed and sealed structure by combining the frame 20 and the end plate 40. At this time, the frame 20 may have an empty interior space like the incision surface A-A of FIG. 1, and the battery cells 11 may be stacked in one direction and positioned in the empty interior space of the frame 20 as shown in FIG. 2.

On the other hand, since a plurality of battery cells 11 are located densely in one space without being isolated from each other in the frame 20, even if the thermal runaway phenomenon occurs only in one of a plurality of battery cells 11 present in the frame 20 due to an overcharge, etc., the thermal runaway phenomenon may be rapidly transferred to the other adjacent battery cells 11.

Moreover, since a plurality of battery modules 10 in the battery pack are disposed so that at least two end plates 40 face each other, when heat, gas, or flame generated in the battery module 10 is discharged to the outside of the battery module 10, It may affect the performance and stability of a plurality of battery cells 11 in the other adjacent battery modules 10.

Therefore, it is necessary to develop the battery module 10 with improved durability and safety by effectively delaying the heat propagation speed during the internal ignition of the battery module 10 and allowing the generated heat, gas, or flame to be rapidly discharged to the outside of the battery module 10.

SUMMARY OF THE DISCLOSURE

The problem to be solved by the present invention is to provide a battery module that prevents the transfer of the thermal runaway phenomenon between the battery cells when the ignition occurs in the battery module and a battery pack including the same.

However, the problems to be solved by the embodiments of the present invention are not limited to the above-described problems and may be variously expanded in the range of the technical ideas included in the present invention.

A battery module according to an embodiment of the present invention includes: a battery cell stack in which a plurality of battery cells are stacked in one direction; and a module frame accommodating the battery cell stack and having an inner surface and an outer surface, wherein at least one vent penetrating the inner surface and the outer surface is formed on a first surface of the module frame, and a cover layer including a barrier layer and at least one refractory layer is positioned between the first surface of the module frame and the battery cell stack.

The at least one vent may be formed on the upper surface of the module frame.

The barrier layer may be positioned below the at least one refractory layer.

The at least one refractory layer may include at least one sub-vent.

The barrier layer may cover a hole of the at least one sub-vent.

The barrier layer may include a protrusion extending from a first surface of the barrier layer, and the protrusion part may be inserted into the at least one sub-vent.

At least parts of the at least one vent and the at least one sub-vent may overlap in a length direction of the battery module.

At least parts of the at least one vent and the at least one sub-vent may overlap in a width direction of the battery module.

The hole of the at least one sub-vent or the at least one vent may form an acute angle with the first surface of the module frame.

The at least one refractory layer may include a first refractory layer and a second refractory layer, and the first refractory layer may be positioned closer to the barrier layer than the second refractory layer.

The first refractory layer may include at least one first sub-vent, and the second refractory layer may include at least one second sub-vent.

At least parts of the at least one first sub-vent and the at least one second sub-vent may overlap in a length direction of the battery module.

At least parts of the at least one first sub-vent and the at least one second sub-vent may overlap in a width direction of the battery module.

The barrier layer may include a material with a melting point of about 300° C. or less.

The barrier layer may include at least one extinguishing agent selected from a group consisting of inorganic carbonates, inorganic phosphates, and inorganic sulfates.

The refractory layer may include aluminum, SUS (Stainless Use Steel), or a clad metal.

A battery pack according to another embodiment of the present invention includes the above-described battery module.

The at least one vent may be formed on the upper surface of the module frame, the at least one second sub-vent may be offset toward a front of the battery module with respect to the at least one first sub-vent, and the at least one vent may be offset toward a rear of the battery module with respect to the at least one second sub-vent.

The at least one second sub-vent may be offset toward a left side of the battery module with respect to the at least one first sub-vent, and the at least one vent may be offset toward a right side of the battery module with respect to the at least one second sub-vent.

According to embodiments, a continuous thermal runaway phenomenon inside the battery module may be prevented by rapidly discharging a gas or the like to the outside of the battery module through a hole in the module frame when an ignition phenomenon occurs in the battery module.

The effects of the present invention are not limited to the foregoing effects, and other non-mentioned effects will be clearly understood by those skilled in the art from the description below.

DETAILED DESCRIPTION OF THE EMBODIMENTS

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

In order to clarify the present invention, parts that are not connected to the description will be omitted, and the same elements or equivalents are referred to by the same reference numerals throughout the specification.

In addition, since the size and thickness of each component shown in the drawing are arbitrarily enlarged or reduced for convenience of explanation, it is self-evident that the content of the present invention is not limited to as shown. In the drawing below, the thickness of each layer is enlarged to clearly express various layers and areas. Also, in the following drawings, for convenience of explanation, the thicknesses of some layers and areas are exaggerated.

It will be understood that when an element such as a layer, film, region, or substrate is referred to as being "on" another element, it can be directly on the other element or intervening elements may also be present. By contrast, it will be understood that when an element is referred to as being "directly on" another element, no intervening elements are present. Further, in the specification, the word "on" or "above" means positioned on or below the object portion, and does not necessarily mean positioned on the upper side of the object portion based on a gravitational direction. On the other hand, when explaining that something is "on" or "above" another part, explaining being "under" or "below" another part may also be understood with reference to the above description.

In addition, since an upper surface/a lower surface of a specific member may be determined differently depending on which direction is referenced, throughout the specification, 'the upper surface' or 'the lower surface' means two surfaces facing each other on a z-axis of the member.

In addition, unless explicitly described to the contrary, the word "comprise", and variations such as "comprises" or "comprising", will be understood to imply the inclusion of stated elements but not the exclusion of any other elements.

Further, in the specification, the phrase "on a plane" means when an object portion is viewed from above, and the phrase "on a cross-section" means when a cross-section taken by vertically cutting an object portion is viewed from the side.

Hereinafter, a battery module according to an embodiment of the present invention is described.

Figure 3:
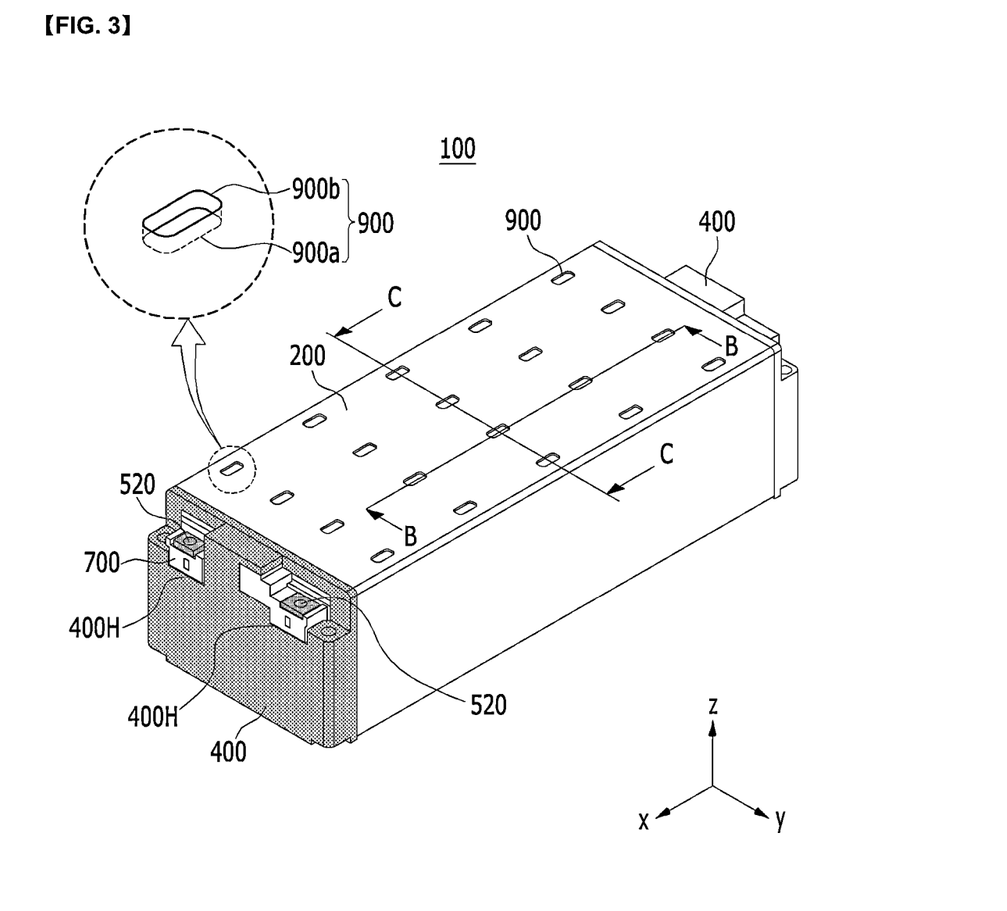
FIG. 3 is a perspective view showing a battery module according to an embodiment of the present invention.
Figure 4:
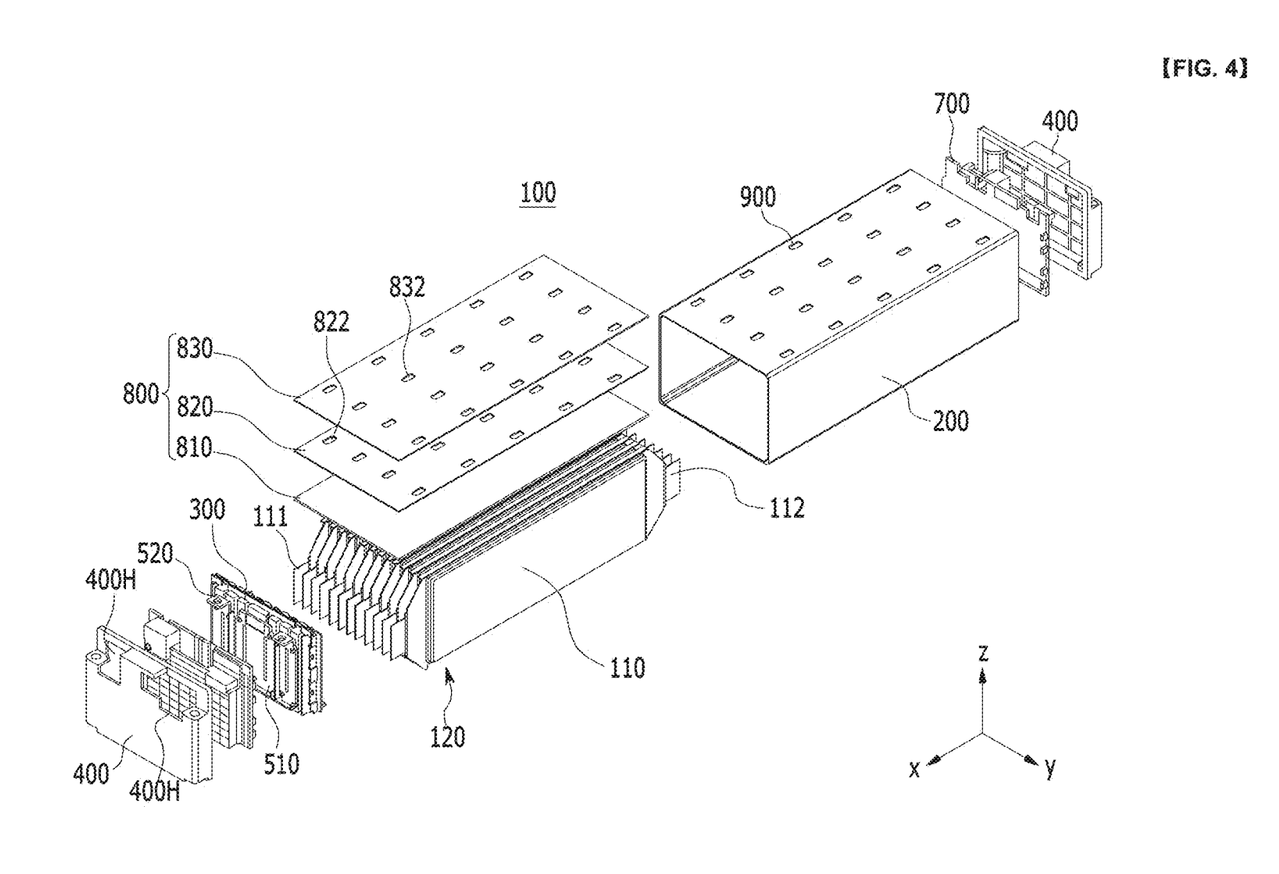
FIG. 4 is an exploded perspective view of a battery module according to FIG. 3.
Figure 5:
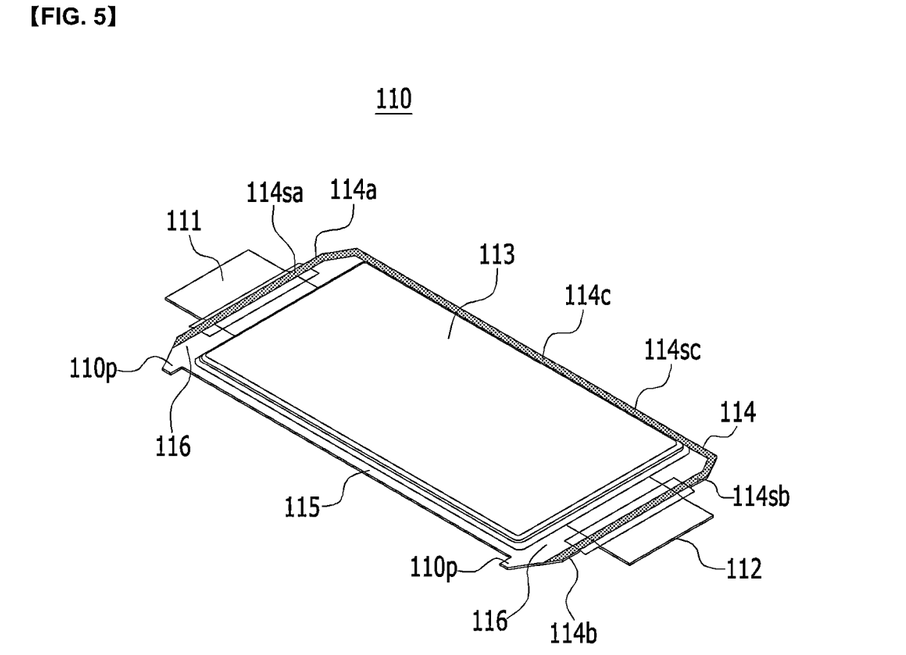
FIG. 5 is a perspective view of a battery cell included in a battery module of FIG. 3.

FIG. 3 is a perspective view showing a battery module according to an embodiment of the present invention. FIG. 4 is an exploded perspective view of a battery module according to FIG. 3. FIG. 5 is a perspective view of a battery cell included in a battery module of FIG. 3.

Referring to FIG. 3 and FIG. 4, a battery module 100 according to an embodiment of the present invention may include a battery cell stack 120 in which a plurality of battery cells 110 are stacked along one direction, a module frame 200 accommodating the battery cell stack 120, a bus bar frame 300 positioned on the front surface and/or the rear surface of the battery cell stack 120, an end plate 400 covering the front surface and/or the rear surface of the battery cell stack 120, and bus bars 510 and 520 mounted on the bus bar frame 300.

Referring to FIG. 5, the battery cell 110 may be provided as a pouch-type in which the number of stacks per unit area may be maximized. The battery cell 110 provided as a pouch-type may be manufactured by accommodating an electrode assembly including a positive electrode, a negative electrode, and a separator in a cell case 114 of a laminate sheet, and then heat-sealing a sealing part of the cell case 114. However, the battery cell 110 does not necessarily have to be provided as the pouch-type, and may be provided in a prismatic, a cylindrical, or other various forms under a level at which a storage capacity required by a device to be mounted in the future is achieved.

The battery cell 110 may include two electrode leads 111 and 112. The electrode leads 111 and 112 may have a structure protruded from one end of the cell body 113, respectively. Specifically, one end of each electrode lead 111 and 112 is electrically connected to the positive electrode or the negative electrode of the electrode assembly by being positioned inside the cell case 114, and the other end of each electrode lead 111 and 112 is positioned and derived outside the cell case 114 to be electrically connected to a separate member, for example, the bus bars 510 and 520. On the other hand, FIG. 4 shows that the positive electrode lead and the negative electrode lead of the battery cell 110 are protruded in opposite directions, but this is not necessarily the case, and it is possible that the electrode leads of the battery cell 110 may be protruded in the same direction.

The electrode assembly in the cell case 114 may be sealed by sealing parts 114sa, 114sb, and 114sc. The sealing parts 114sa, 114sb, and 114sc of the cell case 114 may be positioned on both ends 114a and 114b, and one side 114c connecting them.

The cell case 114 is generally composed of a laminate structure of a resin layer/a metal thin film layer/a resin layer. For example, when the cell case surface is made of an O (oriented)-nylon layer, when a plurality of battery cells 110 are stacked to form a medium or large battery module 100, there is a tendency to slide easily due to an external impact. Therefore, in order to prevent this and maintain the stable stacked structure of the battery cells 110, the battery cell stack 120 may be formed by attaching an adhesive member such as a viscous adhesive such as a double-sided adhesive tape to the surface of the cell case 114 or a chemical adhesive that is bonded by a chemical reaction during the adhesion.

The connection part 115 may refer to an area extending along the length direction from one end of the cell case 114 in which the above-described sealing parts 114sa, 114sb, and 114sc are not positioned. A protrusion part 110p of the battery cell 110 called a bat-ear may be formed at the end of the connection part 115. In addition, a terrace portion 116 may refer to an area between the electrode leads 111 and 112, which are partially protruded to the outside of the cell case 114 and the cell body 113 positioned inside the cell case 114 based on the edge of the cell case 114.

The battery cell stack 120 may be a plurality of battery cells 110 that are electrically connected and stacked in one direction. The direction in which a plurality of battery cells 110 are stacked (hereinafter, referred to as 'a stacking direction') may be a y-axis direction (or −y-axis direction), and 'an axis direction' may be construed as including all +/−directions below.

Meanwhile, as the battery cell 110 is disposed along one direction, the electrode leads of the battery cell 110 may be positioned on one surface, or one surface and the other surface facing the one surface of the battery cell stack 120. As such, the surface on which the electrode leads 111 and 112 are positioned in the battery cell stack 120 may be referred to as the front surface or the rear surface of the battery cell stack 120, the direction from the front surface to the rear surface of the battery cell stack 120, or the opposite direction may be defined as the length direction of the battery cell stack 120, and may be the x-axis direction. The length direction of the battery cell stack 120 may be substantially the same as the length direction of the battery cell 110.

In addition, the surface on which the outermost battery cell 110 is positioned in the battery cell stack 120 may be referred to as a side surface of the battery cell stack 120, and the side surface of the battery cell stack 120 may be described as two surfaces facing each other on the y-axis.

The module frame 200 may protect the battery cell stack 120 and the electrical equipment connected thereto from external physical impact. The module frame 200 may accommodate the battery cell stack 120 and the electronic devices connected thereto in the inner space of the module frame 200. Here, the module frame 200 includes the inner surface and the outer surface, and the inner space of the module frame 200 may be defined by the inner surface.

The structure of the module frame 200 may vary. For example, the structure of the module frame 200 may be a structure of a mono frame. Here, the mono frame may be in the form of a metal plate in which the upper surface, the lower surface, and both side surfaces are integrated. The mono frames may be manufactured by extrusion molding. As another example, the structure of the module frame 200 may be a structure in which a U-shaped frame and an upper plate (an upper surface) are combined. In the case of the structure in which the U-shaped frame and the upper plate are combined, the structure of the module frame 200 may be formed by combining the upper plate with the upper side of the U-shaped frame, which is a metal plate having the lower surface and both side surfaces that are combined or integrated, and each frame or plate may be manufactured by press molding. In addition, the structure of the module frame 200 may be provided in the form of an L-shaped frame in addition to the mono frame or the U-shaped frame, or may be provided in various structures not described in the above-described example.

The structure of the module frame 200 may be provided in an opened form along the length direction of the battery cell stack 120. The front and rear surfaces of the battery cell stack 120 may not be covered by the module frame 200. The front and rear surfaces of the battery cell stack 120 may be covered by the bus bar frame 300 or the end plate 400 to be described later, and through this, the front and rear surfaces of the battery cell stack 120 may be protected from external physical impact.

The top/bottom surfaces, the front/rear surfaces, and both side surfaces of the module frame 200 may be described based on the contents of the battery cell stack 120 described above. Specifically, the top/bottom surfaces of the module frame 200 may be explained as two surfaces facing each other on the z-axis, the front/rear surfaces of the module frame 200 may be explained as two surfaces facing each other on the x-axis, and both side surfaces of the module frame 200 may be explained as two surfaces facing each other on the y-axis. Here, the direction from the front to the rear or from the rear to the front may be the length direction of the module frame 200.

Meanwhile, a compressive pad may be positioned between the battery cell stack 120 and the inner surface of the module frame 200. At this time, the compressive pad may be positioned between the side of the battery cell stack 120 and the side of the module frame 200, and may face at least one of two battery cells 110 at both ends of the battery cell stack 120 with the surface.

In addition, a thermal conductive resin may be injected between the battery cell stack 120 and the inner surface of the module frame 200, and a thermally conductive resin layer may be formed between the battery cell stack 120 and the inner surface of the module frame 200 by the injected thermal conductive resin. At this time, the thermal conductive resin layer may be formed between the lower surface of the battery cell stack 120 and the lower surface of the module frame 200 (or the bottom surface, which may be referred to as a bottom part).

The bus bar frame 300 may be positioned on one surface of the battery cell stack 120 to cover one surface of the battery cell stack 120 and to simultaneously guide the connection between the battery cell stack 120 and an external device. The bus bar frame 300 may be positioned on the front surface or the rear surface of the battery cell stack 120. The bus bar frame 300 may be equipped with at least one of the bus bars 510 and 520 and the module connector. One surface of the bus bar frame 300 may be connected to the front surface or the rear surface of the battery cell stack 120, and the other surface of the bus bar frame 300 may be connected to the bus bars 510 and 520. There may be two bus bar frames 300, and they may be positioned on the front and rear surfaces of the battery cell stack 120, respectively.

The bus bar frame 300 may include an electrically insulating material. The bus bar frame 300 may limit the contact of the bus bars 510 and 520 with parts of the battery cells 110 other than the parts joined to the electrode leads 111 and 112, and may prevent an electric short from occurring.

The end plate 400 may close and seal the opened surface of the module frame 200 to protect the battery cell stack 120 and the electrical equipment connected thereto from an external physical impact. To this end, the end plate 400 may be made of a material having a predetermined strength. For example, the end plate 400 may include a metal such as aluminum.

The end plate 400 may be combined (bonded, sealed, or closed and sealed) with the module frame 200 while covering the bus bar frame 300 or the bus bars 510 and 520 positioned on one surface of the battery cell stack 120. Each edge of the end plate 400 may be joined with the corresponding edge of the module frame 200 by a method such as welding. Also, an insulating cover 700 for electrical insulation may be positioned between the end plate 400 and the bus bar frame 300. The insulating cover 700 may be positioned on the inner surface of the end plate 400 and may be closely attached to the inner surface of the end plate 400, but this is not necessarily the case.

Two end plates 400 may be provided and may include a first end plate positioned on the front surface of the battery cell stack 120 and a second end plate positioned on the rear surface of the battery cell stack 120.

The bus bars 510 and 520 may be mounted on one surface of the bus bar frame 300, and may be for electrically connecting the battery cell stack 120 or the battery cells 110, and an external device circuit. By positioning the bus bars 510 and 520 between the battery cell stack 120 or the bus bar frame 300 and the end plate 400, they may be protected from the external impact, and durability degradation due to external moisture may be minimized.

The bus bars 510 and 520 may be electrically connected to the battery cell stack 120 through the electrode leads 111 and 112 of the battery cell 110. Specifically, the electrode leads 111 and 112 of the battery cell 110 may be bent after passing through a slit formed in the bus bar frame 300 to be connected to the bus bars 510 and 520. The battery cells 110 constituting the battery cell stack 120 may be coupled in series or in parallel by the bus bars 510 and 520.

Meanwhile, the bus bars 510 and 520 may include a terminal bus bar 520 for forming an electrical connection between the battery modules 100. At least a part of the terminal bus bar 520 may be exposed to the outside of the end plate 400 in order to be connected to the external battery module 100, and the end plate 400 may be provided with a terminal bus bar opening 400H for this purpose. The terminal bus bar may be connected to another battery module 100 or a BDU (Battery Disconnect Unit) through the protrusion part exposed through the terminal bus bar opening 400H, and may form a high voltage (HV) connection with them.

The battery module 100 may include a sensing member for detecting and controlling phenomena such as an overvoltage, an overcurrent, and overheating of the battery cell 110. The sensing member is for an LV (Low voltage) connection, where the LV connection may mean a sensing connection for sensing and controlling the voltage of the battery cell. A voltage information and a temperature information of the battery cell 110 may be transmitted to an external BMS (Battery Management System) through the sensing member.

The sensing member may include a temperature sensor that detects the temperature inside the battery module, a sensing terminal that senses the voltage value of the bus bars 510 and 520, a module connector that transmits the collected data to an external control device and receives a signal from an external control device, and/or a connection member for connecting them.

Here, the connection member may be disposed in a form extending along the length direction on the upper surface of the battery cell stack 120, and may be a flexible printed circuit board (FPCB) or a flexible flat cable (FFC).

Also, here, the module connector may be mounted on the above-described bus bar frame 300, and at least a part of the module connector may be exposed to the outside through the module connector opening formed on the end plate 400.

Meanwhile, as described above, an ignition phenomenon may occur inside the battery module 100 in which the battery cells 110 are stacked at a high density. If an ignition occurs in one battery module 100, heat, gas, or flame of the battery module 100 may be transferred to the adjacent battery module 100, so the continuous ignition may occur between the battery modules 100, and accordingly, there was a problem that the durability and stability of the battery module 100 or the battery pack including the same deteriorated.

Therefore, hereinafter, a cover layer 800 and a venting part 900 that may improve the durability and stability of the battery module 100 by solving the above ignition phenomenon are described.

Again referring to FIG. 3 and FIG. 4, the module frame 200 according to an embodiment of the present invention may include a venting part 900 penetrating the inner surface and the outer surface of the module frame 200. The venting part 900 may have a hole shape that communicates with the inlet 900a formed on the inner surface of the module frame 200 and the outlet 900b formed on the outer surface of the module frame 200. The venting part 900 may be for communicating with the inside of the battery module 100 closed and sealed by the module frame 200 and the end plate 400, etc. and the outside of the battery module 100.

The venting part 900 may be for discharging heat, gas, or flames generated when the battery module 100 internally ignites to the outside of the battery module 100. The venting part 900 may prevent the continuous thermal runaway phenomenon by alleviating the internal ignition of the module frame 200 and minimizing the rise in pressure or temperature. Specifically, when the ignition occurs inside the module frame 200, heat, gas, sparks, flames, etc. due to the ignition of the battery cell 110 are discharged to the outside of the battery module 100 through the venting part 900, so that the internal fire is quickly suppressed and the ignition phenomenon may be more relaxed. In addition, as heat, gas, etc. are discharged through the venting part 900, excessive increasing in pressure or temperature inside the battery module 100 may be prevented, and the speed at which the thermal runaway is transferred in the internal space may also be delayed.

The venting part 900 may be formed on at least one surface of the module frame 200. The venting part 900 may be formed on the upper surface of the module frame 200. The venting part 900 may be formed on a surface extending from the module frame 200 along the stacking direction or the length direction of the battery cell stack 120.

At least one venting part 900 formed on the upper surface of the module frame 200 may be used. The greater the number of venting parts 900 formed in the module frame 200, the faster the ignition phenomenon of the module frame 200 may be alleviated. When there are a plurality of venting parts 900, the venting parts 900 may be disposed by forming a row arranged along one direction and a column arranged along a direction perpendicular to the one direction. At this time, the venting part 900 may be formed entirely on one surface of the module frame 200 as in the drawings described above, but this is not always the case, and may be formed on a part of one surface of the module frame 200.

The shape of the inlet 900a and the outlet 900b of the venting part 900 may be a rounded shape with a curvature as in the drawings described above, but this is not necessarily the case, and the inlet 900a and the outlet 900b of the venting part 900 may be provided as circular, elliptical, or polygonal with vertices. In addition, since it is preferable that heat, gas, or flame discharged through the venting part 900 diffuses more rapidly to the outside of the battery module 100, the size of the outlet 900b may be larger than the size of the inlet 900a.

Meanwhile, the direction from the inlet 900a to the outlet 900b of the venting part 900 may be a discharge direction in which gas inside the battery module 100 is discharged to the outside. In the above drawing, the direction from the inlet 900a to the outlet 900b of the venting part 900 is shown to be perpendicular to one surface of the module frame 200 where the venting part 900 is formed, but this is not necessarily the case, and a hole structure may be formed by changing the positions of the inlet 900a and outlet 900b of the venting part 900 so that the discharge direction forms an acute angle with one surface of the module frame 200. As such, since the hole of the venting part 900 has an inclined structure, the exposure of the inside of the battery module 100 is minimized, and foreign substances floating in the air may be prevented from entering the battery module 100 by gravity.

When the discharge direction forms the angle (the acute angle) by changing the positions of the inlet 900a and the outlet 900b of the venting part 900, the direction of heat, gas, or flame discharged from the venting part 900 may be switched (adjusted). Due to this, the length of the discharge path may increase, and the gas discharged through the outlet 900b of the venting part 900 may have a lower temperature. In addition, when the discharge direction of the venting part 900 is formed in a direction in which the adjacent battery modules 100 are not positioned, heat propagation between the adjacent battery modules 100 may be minimized.

When there are a plurality of venting parts 900, the discharge directions of a plurality of venting parts 900 may be the same as or different from each other. When the discharge directions of a plurality of venting parts 900 are formed to be different from each other, gas discharged from the venting part 900 may be diffused into a wider space outside the battery module 100 in various directions. Accordingly, gas may be discharged from the battery module 100 quickly, and an effect such as preventing heat generation of the battery module 100 may be achieved.

On the other hand, when the venting part 900 for communicating with the inside and the outside is provided in the module frame 200 as in the present embodiment, dust and impurities from the outside of the module frame 200 may enter the inside of the module frame 200 through the hole structure of the venting part 900, or external oxygen is supplied along the venting part 900 during the internal ignition, thereby a thermal runaway phenomenon may be promoted. Also, since the gas, spark, etc. discharged through the venting part 900 of the module frame 200 may be in a very high temperature and pressure state, the discharged gas, spark, etc. are transferred to the adjacent battery module 100 and there is a problem that the thermally runaway phenomenon in the adjacent battery module 100 is caused.

Therefore, in the venting part 900 of the present embodiment, a cover layer 800 may be provided to close the hole before the thermal runaway phenomenon occurs, and to open the hole when the thermal runaway phenomenon occurs, thereby slightly lowering the temperature and pressure of the emitted gas.

Again referring to FIG. 4, the battery module 100 according to an embodiment of the present invention may include a cover layer 800 covering the opening of the hole structure of the venting part 900.

Here, the expression 'the cover layer' is to express the shape of the film to block the hole of the venting part 900, so it is clear in advance that it may be expressed by being changed into a stopper, a hood, a lid, a cap, or other words similar thereto.

The cover layer 800 may be positioned under the module frame 200 where the venting part 900 is formed or one surface of the end plate 400. For example, the cover layer 800 may be positioned between the upper surface of the battery cell stack 120 and the upper surface of the module frame 200.

The cover layer 800 may cover the hole of the venting part 900 by disposing it to cover the inlet 900a. The cover layer 800 may be provided in the form of a plate to cover the hole of the venting part 900. The cover layer 800 may be provided in the form of a pad for covering the hole of the venting part 900.

The cover layer 800 may include a plurality of layers. The cover layer 800 may include a barrier layer 810 that may be partially fractured by heat or pressure and refractory layers 820 and 830 made of a refractory material capable of withstanding a predetermined temperature or pressure. Here, the barrier layer 810 may be positioned closer to the battery cell stack 120 than the refractory layers 820 and 830, and when considering the positions, the barrier layer 810 may be referred to as a first layer and the refractory layers 820 and 830 may be referred to as a second layer. Also, here, the refractory layer may include two or more layers as shown in FIG. 4, and for convenience of explanation, the layer positioned relatively close to the barrier layer 810 may be referred to as a first refractory layer 820 and the layer positioned farther from the barrier layer 810 may be referred to as a second refractory layer 830. Alternatively, due to its position, the barrier layer 810 may be referred to as a first layer, the first refractory layer 820 may be referred to as a second layer, and the second refractory layer 830 may be referred to as a third layer.

Meanwhile, a plurality of venting parts may be formed in the refractory layers 820 and 830. To be distinguished from the venting part 900 formed in the module frame 200, the venting parts formed in the refractory layers 820 and 830 may be referred to as sub-venting parts 822 and 832. Each sub-venting part 822 and 832 may have an inlet and an outlet, and the inlet may be positioned relatively below the outlet. The sub-venting parts 822 and 832 formed in the refractory layers 820 and 830 may guide the discharge path of the gas so that the gas, sparks, etc. generated in the battery cell 110 are discharged to the venting part 900 without moving to other spaces in the battery module 100.

The refractory layers 820 and 830 may be made of a material that may withstand a high temperature and high pressure environment for a certain period of time. For example, the refractory layers 820 and 830 may be made of aluminum, stainless use steel (SUS), or a clad metal. The refractory layers 820 and 830 may be injection moldings that may withstand a high temperature and high pressure environment for a certain period of time.

Figure 6:
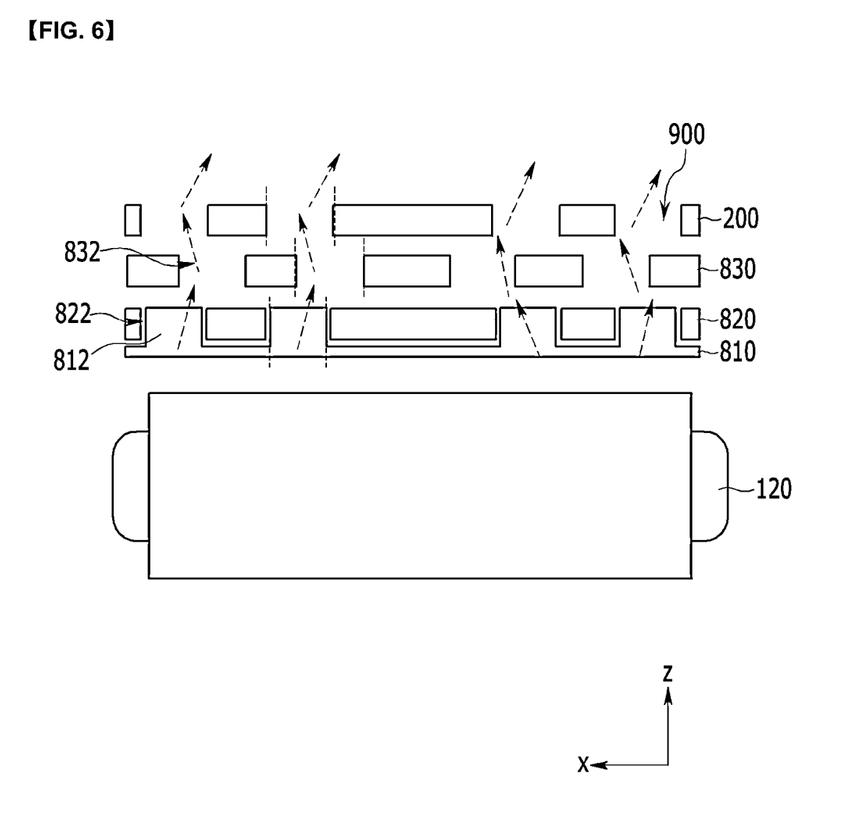
FIG. 6 is a cross-sectional view taken along a cutting line B-B of FIG. 3.

The barrier layer 810 is positioned between the refractory layers 820 and 830, and the battery cell stack 120, and prevents foreign materials from being injected into the battery module 100 before the thermal runaway occurs in the battery module 100, and is removed by heat or pressure after the runaway phenomenon occurs, thereby the venting part 900 and the sub-venting part 822 and 832 may be opened. As seen in FIG. 6 and described later, the upper surface of the barrier layer 810 may be partially protruded, and the protruded portion is inserted into the first sub-venting part 822 formed in the first refractory layer 820, thereby minimizing the inflow of foreign material into the battery module 100.

The barrier layer 810 may include a material that is melted by the internal temperature of the battery module 100. The barrier layer 810 may include a material melted by heat emitted from the battery cell 110, high temperature gas, or sparks. The barrier layer 810 may be made of a material having a melting point of less than or equal to a predetermined range. The barrier layer 810 may be provided with a material having a melting point of 300° C. or less. As a specific example, the barrier layer 810 may include a thermoplastic polymer resin having a melting point of about 200° C. or less. More specifically, the barrier layer 810 may be made of materials having a melting point of about 100° C. or more and 200° C. or less, such as polyethylene or polypropylene.

The barrier layer 810 may include a material for alleviating the ignition phenomenon when the battery module 100 internally ignites. For example, the barrier layer 810 may include a fire extinguishing agent. If the barrier layer 810 includes an extinguishing agent, the battery module 100 may have a self-extinguishing function. Here, the extinguishing agent may be a powder-type extinguishing agent material. The extinguishing agent may generate carbon dioxide and water vapor through a thermal decomposition reaction when the battery module 100 is ignited, and the generated carbon dioxide and water vapor may suppress the flame by preventing external oxygen from flowing into the battery module 100. The extinguishing agent may absorb the heat generated in the battery module by performing the pyrolysis reaction, which is an endothermic reaction, and may also block the external oxygen supply by generating carbon dioxide and water vapor. Accordingly, the flame and heat propagation speed inside the battery module 100 may be effectively delayed, and the safety of the battery module may be improved.

The barrier layer 810 may include at least one extinguishing agent selected from a group consisting of inorganic carbonates, inorganic phosphates, and inorganic sulfates. More specific examples of the extinguishing agent materials may include sodium hydrogen carbonate ($NaHCO_3$), potassium hydrogen carbonate ($KHCO_3$), ammonium phosphate ($NH_4H_2PO_3$), and a mixture of "potassium hydrogen carbonate ($KHCO_3$) and urea ($NH_{22}CO$)". When the cover layer 800 includes potassium hydrogen carbonate ($KHCO_3$), potassium carbonate ($K_2CO_3$), water vapor ($H_2O$), and carbon dioxide ($CO_2$) may be generated through the pyrolysis reaction of potassium hydrogen carbonate. The generated water vapor cancels the flame inside the battery module 100, and the generated carbon dioxide may block the flame from coming into contact with oxygen, etc. However, the extinguishing agent material of the present embodiment is not limited thereto, and if it is a material that performs a fire extinguishing function, it will be available without limitation.

As described above, the barrier layer 810 may be manufactured and provided with materials having the above-described properties, but may also be provided as a material including a plurality of properties or a composite of materials including each property.

Hereinafter, the effect generated by providing the cover layer to the battery module of the present embodiment is described in more detail.

Figure 7:
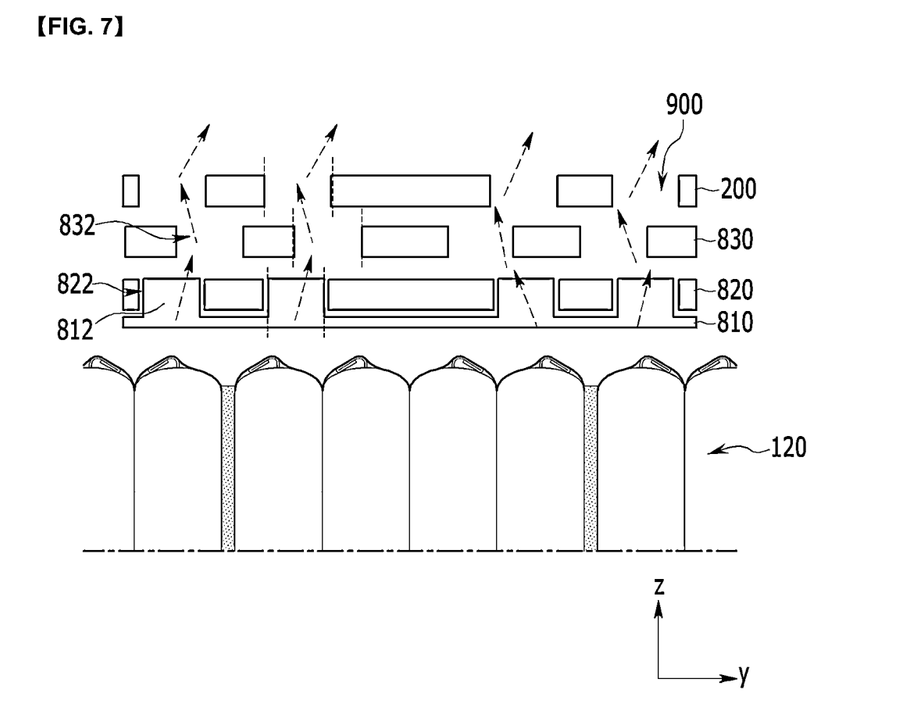
FIG. 7 is a cross-sectional view taken along a cutting line C-C of FIG. 3.
Figure 8:
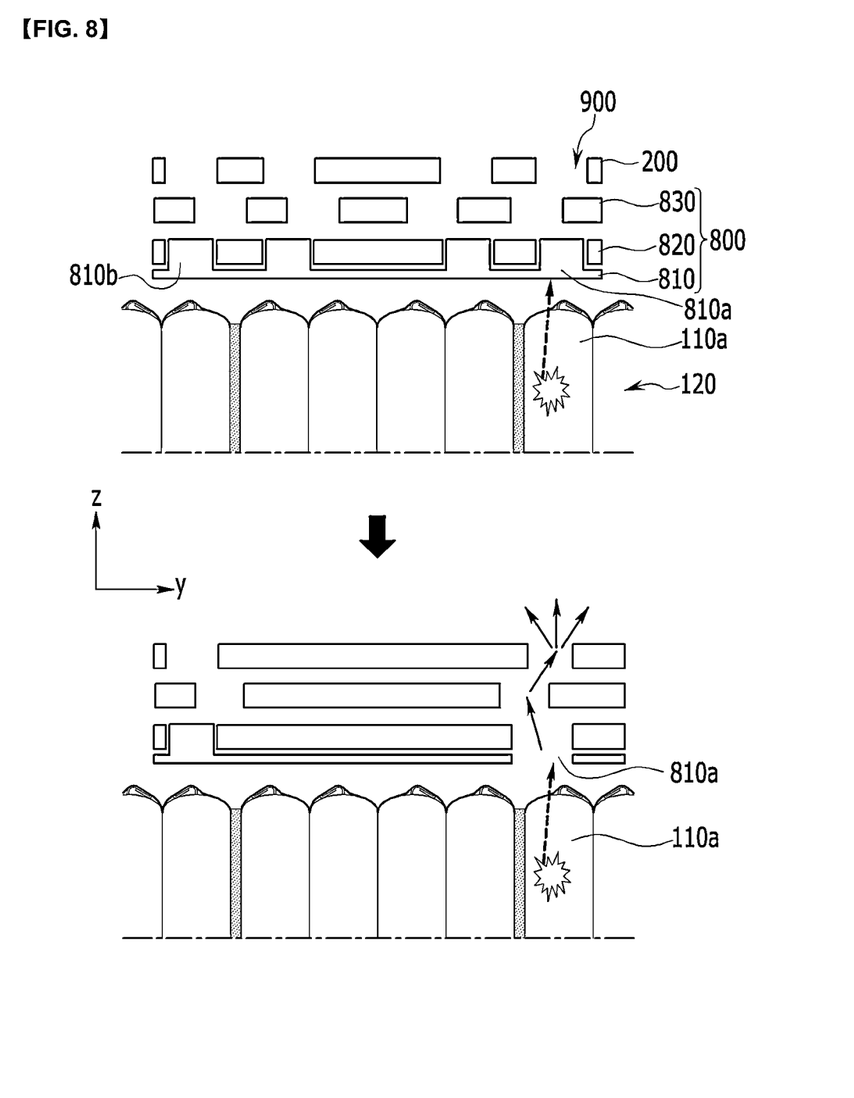
FIG. 8 is a view showing an internal ignition of a battery module according to FIG. 3.

FIG. 6 is a cross-sectional view taken along a cutting line B-B of FIG. 3. FIG. 7 is a cross-sectional view taken along a cutting line C-C of FIG. 3. FIG. 8 is a view showing an internal ignition of a battery module according to FIG. 3. Here, FIG. 6 shows the cross-section on the length direction of the battery module 100, and FIG. 7 shows the cross-section on the width direction of the battery module 100.

Referring to FIG. 6 and FIG. 7, at least a part of the venting part 900 formed in the module frame 200 and the sub-venting part 822 and 832 formed in the refractory layers 820 and 830 may be overlapped on the length direction (the x-axis) of the battery module 100. At least a part of the venting part 900 and the sub-venting parts 822 and 832 may be overlapped in the width direction (the y-axis) of the battery module 100.

At least part of the venting part 900 formed in the module frame 200 and the second sub-venting part 832 formed in the second refractory layer 830, or the first sub-venting part 822 formed in the second sub-venting part 832 and the first refractory layer 820, may overlap in the length direction (the x-axis) of the battery module 100. At least a portion of the venting part 900 and the second sub-venting part 832, or the second sub-venting part 832 and the first sub-venting part 822, may be overlapped in the width direction (the y-axis).

When the holes formed in the module frame 200 and the refractory layers 820 and 830 partially overlap each other, the path of gas discharged to the outside of the battery module 100 through the hole may be switched. Specifically, since the holes formed in the module frame 200 and the refractory layers 820 and 830 do not completely correspond to each other, like an arrow shown in FIG. 6 and FIG. 7, the path through which gas is discharged may form an angle with the z-axis. The path through which gas is discharged may be formed in a zigzag shape. Since the holes formed in the module frame 200 and the refractory layers 820 and 830 do not completely correspond to each other, the discharge path may be longer than in the case where the holes correspond to each other. The gas discharge path may be longer than the shortest distance between the upper surface of the battery cell stack 120 and the module frame 200. As the discharge path of the gas becomes somewhat longer, the temperature and pressure of the gas discharged to the outside of the battery module 100 may be further lowered, and energy may be low enough to not affect the adjacent battery module 100.

Although not specifically illustrated, the venting parts 900 and the sub-venting parts 822 and 832 formed in the module frame 200 and the refractory layers 820 and 830 may have a structure of an inclined hole. If the holes of each venting part 900 and sub-venting parts 822 and 832 are formed to form the acute angle with one surface of the module frame 200, the above-described switching of the discharge path may be implemented more effectively.

Referring to FIG. 8, when flame, gas, or spark occurs inside the battery module 100, specifically, in some battery cells 110, the barrier layer 810 around the ignition phenomenon is physically torn or chemically melted and penetrated by heat or pressure (penetrating), and thus the venting part 900 and the sub-venting part 822, and 832 may be opened. Heat, gas, or sparks inside the battery module 100 may be discharged through the opened venting part 900 and sub-venting parts 822 and 832, and the ignition phenomenon of the battery module 100 may be alleviated. Here, the process in which the barrier layer 810 is penetrated, that is, opened, may accompany an endothermic reaction, and the temperature inside the battery module 100 may be somewhat lowered by the barrier layer 810 absorbing the internal heat. Heat, gas, etc. emitted to the outside of the venting part 900 through the endothermic reaction of the barrier layer 810 may lose the energy enough to not affect the adjacent battery module 100, and the spark loses energy and is transformed into particles, thereby the thermal runaway of the adjacent battery module 100 may not be promoted.

On the other hand, in the above, it has been mainly described that the barrier layer 810 is opened through the chemical reaction for the effect of the barrier layer 810, even when the barrier layer 810 is physically opened by pressure, etc., since the kinetic energy of gas or spark is reduced in the process of removing the barrier layer 810, heat, gas, etc. emitted to the outside of the battery module 100 may lose the energy enough to not affect the adjacent battery module 100, and the spark may lose energy and become particles, which may not promote the thermal runaway phenomenon of the adjacent battery module 100.

On the other hand, since the barrier layer 810 may be opened only when heat or pressure over a predetermined range is applied, only the barrier layer 810 positioned around the ignition phenomenon may be opened individually. The barrier layer 810 may prevent the promotion of the thermal runaway phenomenon due to additional oxygen inflow as only a portion of a plurality of venting parts 900 and sub-venting parts 822 and 832 is opened.

Specifically, when the ignition occurs in the first battery cell 110*a*, the first portion 810*a* of the barrier layer 810 corresponding to the first battery cell 110*a* is opened, so that gas, flame, etc. generated in the first battery cell 110*a* may be discharged. At this time, the second part 810*b* of the barrier layer 810 positioned above the second battery cell 110*b* in which the ignition phenomenon has not occurred in the battery module 100 may not be opened, and the first sub-venting part 822 corresponding to the second part 810*b* may be in the closed state. As such, the additional inflow of external oxygen into the battery module 100 may be blocked as the closed state of the barrier layer 810 of the other part where the ignition phenomenon does not occur is maintained, so the amplification of the flame generated inside the battery module 100 by inflowed oxygen may be suppressed.

Meanwhile, the barrier layer 810 may include a protrusion part 812 partially protruded from one surface of the barrier layer 810. The protrusion part 812 may be formed on the upper surface of the barrier layer 810. At this time, the size of the protrusion part 812 may be similar to or smaller than the size of the first sub-venting part 822, through which the protrusion part 812 may be inserted into the first sub-venting part 822 formed in the first refractory layer 820. The outer shape of the protrusion part 812 may correspond to the inner shape of the first sub-venting part 822, whereby the hole of the first sub-venting part 822 may be closed by the protrusion part 812. When the protrusion part 812 of the barrier layer 810 is provided to fill the hole of the first sub-venting part 822 of the first refractory layer 820, the region where the protrusion part 812 is formed in the barrier layer 810 may have a rather thick thickness. When the protrusion part 812 is formed on the barrier layer 810, the space occupied by the barrier layer 810 inside the battery module 100 is the same, but since the rather thick barrier layer 810 has to be opened for the battery module 100 to emit gas to the outside, the fire suppression effect by the barrier layer 810 may be greater. However, this is not necessarily the case, and it is possible that the protrusion part 812 is not formed on the barrier layer 810 and that the barrier layer 810 has a flat shape.

Meanwhile, the above-described battery module 100 may be included in the battery pack. The battery pack may have a structure in which one or more battery modules according to the present embodiment are added, and may have a structure in a battery management system (BMS) and a cooling device that manage the temperature or voltage of the battery are added and packed.

The above-described battery module and the battery pack including the same can be applied to various devices. Such a device may be applied to transportation means such as an electric bicycle, an electric vehicle, a hybrid vehicle, etc., but the present invention is not limited thereto, and is applicable to various devices that can use a battery module, which is also within the scope of the present invention.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

EXPLANATION OF REFERENCE NUMERALS AND SYMBOLS

100: battery module
110: battery cell
111,112: electrode lead
120: battery cell stack
200: module frame
800: cover layer
810: barrier layer
820,830: refractory layer
900: venting part

What is claimed is:

1. A battery pack comprising:
   a battery cell stack having a plurality of battery cells stacked in a first direction; and
   a battery cover covering the battery cell stack and having a first surface facing the battery cell stack and a second surface opposite to the first surface, wherein the battery cover includes:
  a venting part that extends from the first surface to the second surface of the battery cover,
  a barrier layer that covers the venting part to close the venting part at the first surface of the battery cover, the barrier layer having an inner surface that is exposed to the battery cell stack, and
  a first refractory part positioned on an outer surface of the barrier layer that is opposite to the inner surface of the barrier layer,
wherein planes of the barrier layer and the first refractory part are parallel to each other,
wherein the barrier layer is configured to be fractured or melted from pressure or heat generated in the battery cell stack to open the venting part to allow at least one of heat, gas and flames to pass from the battery cell stack to an outside of the battery cover through the venting part,
wherein the barrier layer includes a first part that overlaps and covers the venting part in an extending direction of the venting part, and a second part that does not overlap the venting part in the extending direction of the venting part,
wherein the first refractory part is seated at the barrier layer, and
wherein a surface of the first refractory part and a surface of the barrier layer are provided at a substantially same height.

2. The battery pack of claim 1, further comprising a frame on the battery cover,
  wherein the battery cover further includes a second refractory part between the first refractory part and the frame.

3. The battery pack of claim 2, further comprising an extending space between the first refractory part and the frame.

4. The battery pack of claim 2, wherein the second refractory part includes a first portion that overlaps the first refractory part in an extending direction of the venting part, and a second portion that does not overlap the first refractory part in the extending direction of the venting part.

5. The battery pack of claim 1, wherein the first part of the barrier layer includes a protrusion that is inserted into the venting part.

6. The battery pack of claim 1, wherein the venting part of the battery cover includes a plurality of venting parts arranged in the first direction and are parallel to each other, and
  wherein the barrier layer covers the plurality of venting parts.

7. The battery pack of claim 6, wherein the barrier layer extends in at least one of the first direction and a second direction that intersects the first direction.

8. The battery pack of claim 1, wherein a thickness of the barrier layer is different from a thickness of the first refractory part, and
  wherein a first thickness of the first part of the barrier layer is greater than a second thickness of the second part of the barrier layer.

9. The battery pack of claim 1, wherein the first refractory part is positioned closer to the barrier layer than a second refractory part.

10. The battery pack of claim 9, wherein the first refractory part includes at least one sub-vent.

11. The battery pack of claim 10, wherein at least a part of the at least one sub-vent overlaps with the barrier layer.

12. The battery pack of claim 1, wherein the barrier layer includes a material with a melting point of about 300° C. or less.

13. The battery pack of claim 1, wherein the barrier layer includes at least one extinguishing agent selected from a group consisting of inorganic carbonates, inorganic phosphates, and inorganic sulfates.

14. The battery pack of claim 1, wherein the first refractory part includes aluminum, SUS (Stainless Use Steel), or clad metal.

15. The battery pack of claim 1, further comprising at least one battery module that accommodates the battery cell stack.

16. The battery pack of claim 10, wherein the second refractory part includes at least another sub-vent, and
  wherein the at least one sub-vent of the first refractory part is offset with respect to the at least another sub-vent of the second refractory part.

17. The battery pack of claim 1, wherein the barrier layer is interposed between the first refractory part and the battery cell stack.

18. The battery pack of claim 2, wherein at least one of the first refractory part and the second refractory part is a sheet.

19. A battery pack comprising:
  a battery cell stack having a plurality of battery cells stacked in a first direction; and
  a battery cover covering the battery cell stack and having a first surface facing the battery cell stack and a second surface opposite to the first surface of the battery cover; and
  a frame on the battery cover and having a surface facing towards the battery cover,
  wherein the battery cover includes:
    a barrier layer on the battery cell stack and having a first surface facing towards the frame and a second surface facing towards the battery cell stack;
    a first refractory part on the first surface of the barrier layer;
    a second refractory part on the surface of the frame facing towards the battery cover; and
    a venting part that extends from the barrier layer to the frame,
  wherein planes of the barrier layer, the first refractory part and the second refractory part are parallel to each other,
  wherein the barrier layer is configured to be fractured or melted from pressure or heat generated in the battery cell stack to open the venting part to allow at least one of heat, gas and flames to pass from the battery cell stack to an outside of the battery cover through the venting part,
  wherein the barrier layer includes a first part that overlaps and covers the venting part in an extending direction of the venting part, and a second part that does not overlap the venting part in the extending direction of the venting part,
  wherein the first refractory part is seated at the barrier layer, and
  wherein a surface of the first refractory part and a surface of the barrier layer are provided at a substantially same height.

20. The battery pack of claim 19, further comprising an extending space between the first refractory part and the frame.

21. The battery pack of claim 19, wherein the second refractory part includes a first portion that overlaps the first refractory part in an extending direction of the venting part, and a second portion that does not overlap the first refractory part in the extending direction of the venting part.

22. The battery pack of claim 19, wherein the first part of the barrier layer includes a protrusion that is inserted into the venting part.

23. The battery pack of claim 19, wherein the venting part of the battery cover includes a plurality of venting parts arranged in the first direction and are parallel to each other, and wherein the barrier layer covers the plurality of venting parts.

24. The battery pack of claim 23, wherein the barrier layer extends in at least one of the first direction and a second direction that intersects the first direction.

25. The battery pack of claim 19, wherein a thickness of the barrier layer is different from a thickness of the first refractory part, and wherein a first thickness of the first part of the barrier layer is greater than a second thickness of the second part of the barrier layer.

26. The battery pack of claim 19, wherein the first refractory part is positioned closer to the barrier layer than the second refractory part.

27. The battery pack of claim 1, wherein at least a portion of the first refractory part covers the venting part, and wherein the surface of the barrier layer is distal from the battery cell stack and is partially protruded into the venting part.

28. The battery pack of claim 19, wherein at least portions of the first refractory part and the second refractory part cover the venting part, and wherein the surface of the barrier layer is distal from the battery cell stack and is partially protruded into the venting part.

29. The battery pack of claim 1, wherein the first part of the barrier layer is directly attached to the first refractory part.

30. The battery pack of claim 19, wherein the first part of the barrier layer is directly attached to the first refractory part.

* * * * *